Aug. 28, 1934.  W. A. SCOTT  1,971,467
MILKING MACHINE TEAT CUP
Filed March 19, 1932  2 Sheets-Sheet 1

WITNESS:

INVENTOR
Walter A. Scott
BY
ATTORNEYS.

Aug. 28, 1934.  W. A. SCOTT  1,971,467
MILKING MACHINE TEAT CUP
Filed March 19, 1932  2 Sheets-Sheet 2

WITNESS:

INVENTOR
Walter A. Scott
BY
ATTORNEYS.

Patented Aug. 28, 1934

1,971,467

UNITED STATES PATENT OFFICE 1,971,467

MILKING MACHINE TEAT CUP

Walter A. Scott, Poughkeepsie, N. Y., assignor to The De Laval Separator Company, New York, N. Y., a corporation of New Jersey Application March 19, 1932, Serial No. 599,911

3 Claims. (Cl. 31—85)

The object of my invention is to substantially increase the efficiency of a double chambered teat cup for milking machines and at the same time automatically maintain the inner flexible and elastic liner under proper tension notwithstanding the stretching of the same due to continued use.

It is a well known characteristic of a rubber teat cup liner that, due to the pneumatic pulsations to which it is subjected and to the tendency of rubber to more or less deteriorate with diminution of its elasticity, the liner becomes more or less stretched after it has been in use for a comparatively short time, necessitating partial disassemblage of the teat cup and readjustment of the liner. This is not usually done skillfully and, moreover, between adjustments, the liner progressively diminishes in efficiency. In other words, the factor of efficiency is necessarily variable, even with competent adjustments from time to time.

The object of the invention is to provide means whereby the stretch of the liner will be taken up automatically and a proper tension maintained on the liner at all times, thereby avoiding the necessity for adjustment and maintaining the efficiency of the liner at an approximately constant value.

The means that I have devised for accomplishing the last mentioned purpose also functions to impart to the liner a limited longitudinally reciprocating movement during milking, thereby massaging the teat in such a manner as to create a condition which is highly favorable to securing the maximum yield of milk from the cow. It is well known that the more agreeable the milking operation is to the sensory system of the cow, the greater the milk yield. The greater efficiency of my improved teat cup is believed to be explicable on this theory.

The invention is susceptible of embodiment in different forms, several of which are shown in the accompanying drawings, in which—

Figure 1:
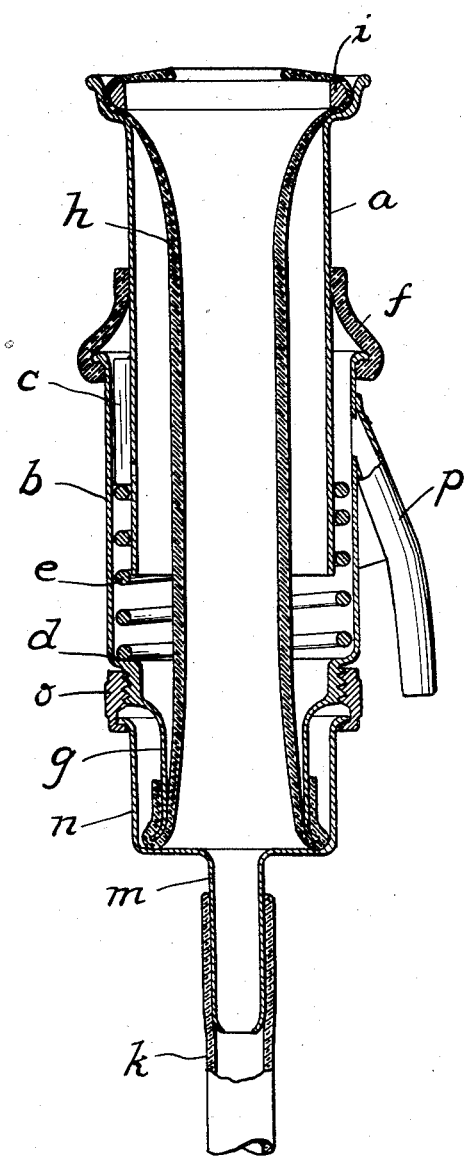
Fig. 1 is a longitudinal section through a teat cup embodying my invention.

In the construction shown in Fig. 1, the teat cup casing comprises an inner shell $a$ and an outer shell $b$. The inner shell is provided on its outer wall with a number of longitudinally extending ribs $c$, between which and an internal shoulder $d$ on the outer shell is confined a coil spring $e$. Closing the annular space between the two shells at the upper end of the outer shell $b$ is a rubber ring $f$, the upper end of which engages the shell $a$ and the lower end of which extends under an external annular flange on the upper end of shell $b$.

The outer shell $b$ at its lower end is contracted to form a neck $g$. The inner rubber liner $h$ is stretched and expanded at its upper end and there held within the expanded upper end of the inner shell $a$ by means of an internal ring $i$. The lower end of the rubber liner is bent outward and upward over the lower end of the neck $g$ of the outer shell $b$.

The upper end of milk hose $k$ is slipped over a nozzle $m$ on a cup-shaped member $n$, which is carried by a ring $o$ threaded on the outer shell just below the shoulder $d$.

Projecting from the outer shell $b$ is a nozzle $p$ which is adapted for connection with a source of pneumatic pulsations, whereby the space surrounding the rubber liner $h$ is subjected alternately to atmospheric pressure and partial vacuum. Through the milk hose $k$ the milk chamber within the liner $h$ of the teat cup is subjected to a constant partial vacuum.

The tension of the spring $e$ is such as to maintain the proper tension on the liner $h$. When in use, as the liner becomes somewhat stretched, the spring $e$ expands and maintains proper tension on the liner.

In actual operation, due to the alternate balancing and unbalancing of pressure within the teat cup with the pressure of the atmosphere outside the teat cup, the outer shell $b$ will have imparted to it a limited movement of longitudinal reciprocation relative to the inner shell $a$, whereby the liner will be alternately longitudinally expanded and contracted to a slight but substantial extent, thus imparting a massaging movement to the teat. It is found that this action of the teat cup materially increases the efficiency of the teat cup in that it milks faster and cleaner. This result is believed to be due to the massaging action of the liner upon the teat, such action being wholly distinct from, and additional to, the alternate compression and release of the teat which characterizes the operation of the ordinary double chambered teat cup.

Figure 2:
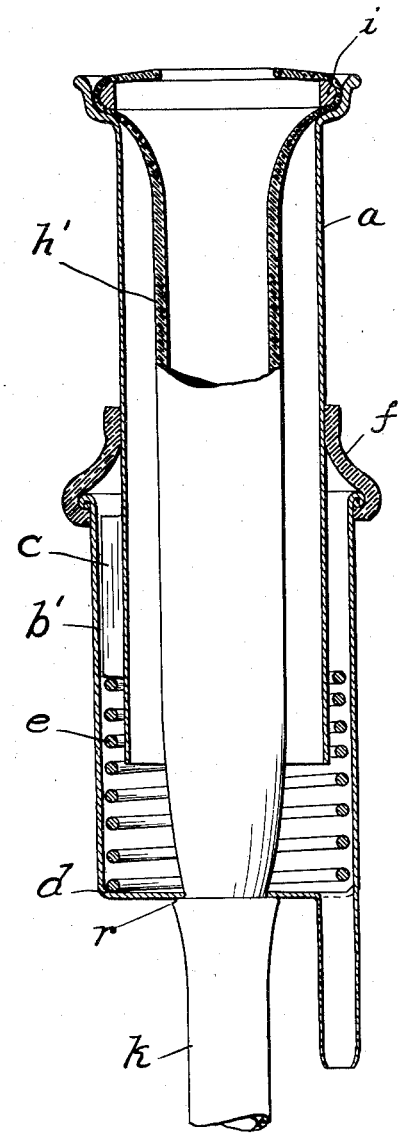
Figs. 2, 3 and 4 are similar views of modifications.

The invention is capable of embodiment in other forms. In Fig. 2 the construction is the same as in Fig. 1 except that the liner $h'$ is integral with the milk tube $k'$, the latter having a shoulder $r$. To secure the lower end of the liner in position, the milk tube $k'$ is drawn down through an orifice in the bottom of shell $b'$ until the shoulder $r$ is drawn through the orifice, whereupon the pull on the tube $k'$ is released and the shoulder snaps against the surface of the shell bottom surrounding and adjacent to said orifice.

Figure 3:
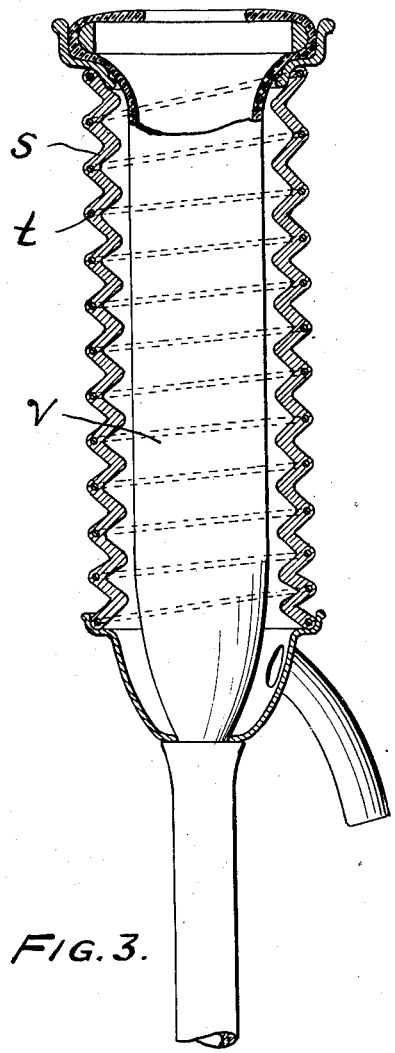

In Fig. 3, the invention is shown as embodied in a casing consisting of a longitudinally expansible and contractible spirally corrugated shell $s$, preferably of rubber, within which is confined or embedded a coil spring $t$. The casing is contractible and expansible in length and the spring maintains the liner $v$ under proper tension.

Figure 4:
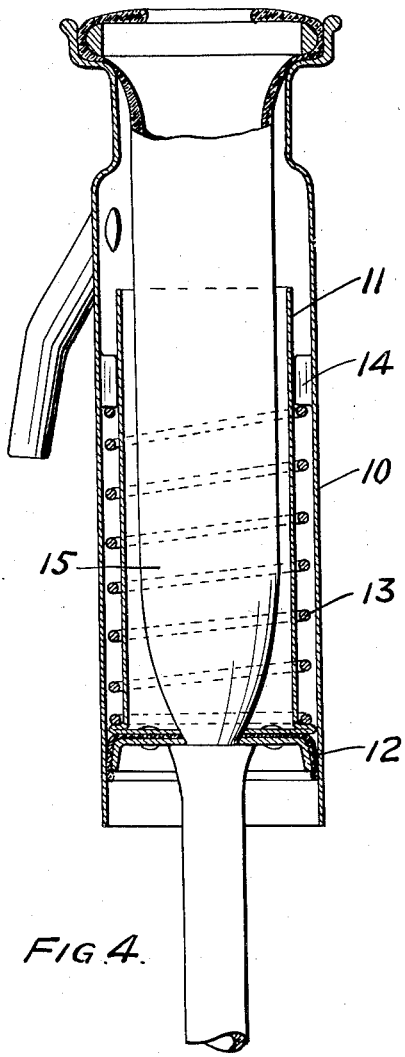

In Fig. 4, the outer shell 10 extends throughout the length of the teat cup. Within the outer shell is an inner shell 11 the bottom of which may comprise or carry a flanged disc 12 whose rim engages the inner wall of the outer shell 10. Between said shells is a coil spring 13. The spring is confined between said disc 12 and ears 14 secured to the inner wall of the outer shell 10. The liner 15 may be secured at its upper end as shown in Figs. 1 and 2. At its lower end it may be secured in fixed relation to the disc 12 in the same way as, in Fig. 2, it is secured in fixed relation with the bottom of outer shell $b'$. In this construction the cylindrical part of shell 11 may be omitted, its main function being a guide for the spring; the longitudinal contraction and expansion of the casing being effected by the movement of its bottom 12 relative to its cylindrical body 10.

What I claim and desire to protect by Letters Patent is:

1. A teat cup comprising an outer longitudinally expansible and contractible casing, a separate inner flexible and elastic liner secured at its opposite ends to said outer casing and enclosing an inner milk chamber adapted to be maintained under partial vacuum at different distances from the longitudinal axis of the teat cup and forming with the outer casing an enclosed chamber adapted to be subjected to pneumatic pulsations, means including a spring tending to expand the outer casing longitudinally and thereby maintain the liner under tension as it stretches in use, and means maintaining the spring out of contact with the liner when the latter expands radially, said parts being arranged to provide pneumatic pressure areas which are adapted, when the pulsation chamber is under low pressure, to be unbalanced and thereby longitudinally contract the outer casing against the action of the spring, whereby during the milking operation the teat will be subjected to a massaging action.

2. A teat cup comprising an outer casing comprising two parts which include two concentrically arranged members relatively movable longitudinally, an inner flexible and elastic liner whose opposite ends are connected with said parts respectively and which encloses an inner milk chamber adapted to be maintained under partial vacuum and forms with the outer casing an enclosed chamber adapted to be subjected to pneumatic pulsations, and a spring confined between said parts and tending to expand the liner longitudinally, said spring extending within the annular space between said concentrically arranged members the inner of which thereby maintains the teat when radially expanded out of contact with the spring.

3. A teat cup comprising an outer casing comprising two parts relatively movable longitudinally, a spring operating on said parts and tending to expand the cup longitudinally, and an inner flexible and elastic liner secured at its upper end to one of said parts and at its lower end to the other of said parts at respectively relatively great and small distances from the longitudinal axis of the teat cup, whereby, when the space between the liner and the casing is under low pressure, unbalanced pneumatic pressure will longitudinally contract the liner and the casing.

WALTER A. SCOTT.